United States Patent [19]

Hirayama

[11] 3,804,703

[45] Apr. 16, 1974

[54] GLASS-TO-METAL SEALS COMPRISING RELATIVELY HIGH EXPANSION METALS

[75] Inventor: Chikara Hirayama, Murrysville, Pa.

[73] Assignee: The United States of America as represented by the Administration of the National Aeronautics and Space Administration, Washington, D.C.

[22] Filed: Apr. 21, 1970

[21] Appl. No.: 30,498

[52] U.S. Cl.................. 161/196, 106/52, 117/129, 65/DIG. 11
[51] Int. Cl............................................ B32b 17/06
[58] Field of Search....... 106/52; 161/196; 117/129; 68/DIG. 11, 59

[56] References Cited
UNITED STATES PATENTS

| | | | |
|---|---|---|---|
| 3,121,628 | 2/1964 | Loehrke............................ | 106/52 X |
| 2,581,639 | 1/1952 | Duncan et al................... | 106/52 X |
| 2,643,020 | 6/1953 | Dacton............................. | 106/52 |
| 2,776,900 | 1/1957 | Duncan et al................... | 106/52 |

OTHER PUBLICATIONS

Yolf, M. B; Chemically Resistant Glasses, in Technical Glasses; London, 1961, p. 93.
Yolf, M. B.; Sealing Glasses, in Technical Glasses, London, 1961, pp. 22–24, 323, 332–334 & 345.

*Primary Examiner*—L. Dewayne Rutledge
*Assistant Examiner*—W. R. Satterfield
*Attorney, Agent, or Firm*—N. T. Musial; G. E. Shook; J. R. Manning

[57] ABSTRACT

A moisture resistant solder glass characterized by a linear coefficient of expansion of from about 12 to 14 $\times 10^{-6}$/°C between room temperature and 500°C and consisting essentially of, by molar percent, about 9% of $K_2O$, about 10% of $Na_2O$, about 70% of $SiO_2$, about 6% of $Al_2O_3$, and about 5% of MgO.

3 Claims, 2 Drawing Figures

GLASS-TO-METAL SEALS COMPRISING RELATIVELY HIGH EXPANSION METALS

The invention described herein was made in the performance of work under a NASA contract and is subject to the provisions of Section 305 of the National Aeronautics and Space Act of 1958. Public Law 85–568 (72 Stat. 435; 42 U.S.C. 2457).

BACKGROUND OF THE INVENTION

1. Field of the Invention

This invention relates to a solder glass having a relatively low melting point and, more particularly, to a glass suitable for glass-to-metal seals and having resistance to attack by moisture and a high coefficient of linear thermal expansion.

2. Description of the Prior Art

Glass to metal sealed assemblies are extensively used in the electronic and electrical industry. The type of metal varies from the low expansion alloys, such as Kovar, to the high expansion metals such as copper and aluminum. Between these extremes are the relatively low-cost alloys, such as cold rolled and ordinary stainless steel, whose linear expansion coefficients are about $13 \times 10^{-6}/°C$.

The fabrication of Kovar-to-glass assemblies are well established. Such glasses have low expansion coefficients matchine substantially the coefficients of the Kovar. However, where the metal involved in a glass-to-metal seal is a metal having a high expansion coefficient such as cold rolled and stainless steel, a glass having a comparable coefficient of expansion is not readily available. That is particularly true where a resistance to moisture by the glass is necessary. Associated with the foregoing is the need for a glass having chemical durability and a relatively low working temperature.

SUMMARY OF THE INVENTION

In accordance with this invention it has been found that the foregoing problems and disadvantages may be overcome by providing a glass having a composition which includes $K_2O$, $Na_2O$, $SiO_2$, $Al_2O_3$, and MgO. A glass having that composition is characterized by an expansion coefficient of between 12 and $14 \times 10^{-6}/°C$ and an excellent resistance to attack by moisture. Moreover, the glass has excellent chemical durability and a relatively low working temperature such as 650°C.

DESCRIPTION OF THE PREFERRED EMBODIMENT

Figure 1:
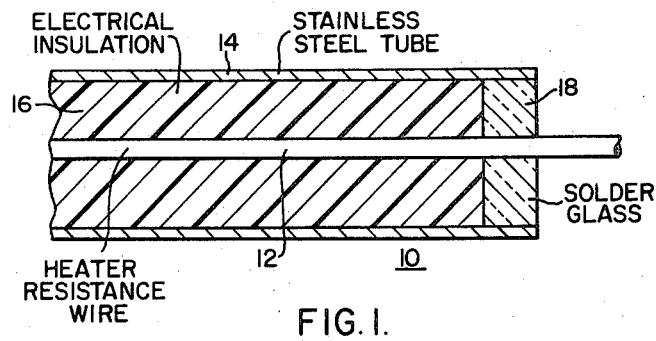
FIG. 1 is a sectional view of a plug-in type heating element for an electric range.

As shown in FIG. 1 an end portion of a heating element for a surface heater of an electric range is generally indicated at 10. It includes an elongated heater resistance wire 12 disposed within a sheath 14 with insulation 16 disposed between the wire and the sheath. A glass closure 18 is disposed within the open end of the sheath 14 between the wire and the sheath. The heater resistance wire 12 is disposed substantially at the axis of the sheath 14 and is composed of a heat resistance alloy having a high thermal expansion coefficient of about $13.5 \times 10^{-6}/°C$.

The sheath 14 is preferably composed of an alloy containing approximately 32% nickel, 21% chromium, and 46% iron and is generally sold under the trademark Inconel. Other types of stainless steel may be used, all of which have a thermal coefficient of linear expansion of about $12 \times 10^{-6}/°C$.

As shown in FIG. 1 the interior of the sheath 14 is filled with an electrical insulation material 16 for supporting the heater resistance wire 12 substantially centrally of the sheath and to prevent any electrical short between the wire and the sheath. The insulation 16 is preferably composed of highly compacted powdered or pulverized magnesium oxide. The wire 12 may be of any configuration such as an elongated rod extending axially of the sheath 14 from one end to the other. The wire 12 has terminal portions which extend from opposite open ends of the sheath 14. The wire end portions are sealed within the end portions of the sheath 14 by a solid insulator such as the glass closure 18.

In accordance with this invention the glass closure 18 comprises compositions, in molar percent, of from about 60 to about 75% of $SiO_2$, from about 14 to about 25% of $K_2O$ and $Na_2O$, from about 3 to about 10 molar percent of $Al_2O_3$, and from about 3 to 8% of MgO. Minor amounts of incidental impurities may be present. The better alloys are composed of from about 67 to 72% of $SiO_2$, from a total of about 17 to 22% of $K_2O$ and $Na_2O$ in equimolar amounts, from about 4 to 8% of $Al_2O_3$, and from about 4 to 7% MgO. The preferred alloy composition is about 70% of $SiO_2$, about 9% of $K_2O$, about 10% of $Na_2O$, about 6% of $Al_2O_3$, and about 5% of MgO for achieving a satisfactory combination of primary characteristics; namely, (1) a high thermal expansion coefficient of about $13 \times 10^{-6}/°C$ between room temperature and 500°C, and (2) resistance to attack by moisture and other chemicals.

$SiO_2$ provides the glass network and may be present in an amount varying from 60 to 75 molar percent. Generally, below 60% of $SiO_2$ the composition loses the resistance to moisture at a rapid rate and above 75% of $SiO_2$ the coefficient of thermal expansion decreases. It has been found that where less than about 65% of $SiO_2$ is present another metal oxide, except alkali metal oxides, may be added such as oxides of boron, calcium, and barium. Such metal oxides, however, when added to the glass result in higher melting temperature and lower thermal expansion coefficient; and the resistance to moisture of this glass is good.

$K_2O$ and $Na_2O$ are used to help maintain the high thermal expansion coefficient and to provide a low softening temperature. The latter property is desirable in order to enable fusion of the glass-to-metal at lower handling temperature, such as about 650°C. $K_2O$ and $Na_2O$ may be used in amounts of from about 7 to 12.5 molar percent. Below 7% a thermal expansion coefficient is sacrificed and above 12.5% the moisture resistance and electrical resistivity decreases. $K_2O$ and $Na_2O$ may be used preferably together in amounts up to 25 molar percent. Above 25% of $K_2O$ and $Na_2O$ combined the glass loses moisture resistance although it has a high expansion coefficient. The preferred mixture of $K_2O$ and $Na_2O$ is maintained at about 1 to 1 or equal molar ratios with the preferred composition including about 9 molar percent of $K_2O$ and about 10 molar percent of $Na_2O$. It has been found that either one of $K_2O$ and $Na_2O$ may be used singly, but with equal molar amounts of these compounds a more desirable combination of resistance to moisture and coefficient of thermal expansion are obtained.

Other alkali metal oxides than $K_2O$ and $Na_2O$ may be used such as oxides of cesium, rubidium, and lithium. Aside from the disadvantage of the higher cost for cesium and rubidium, it is believed that the large ion size of cesium and rubidium would result in a weaker electrostatic bond to the silicate network. For that reason it is preferred to use the oxides of potassium and sodium in equal molar combinations as indicated above because their ion sizes are comparable with holes in the glass network.

$Al_2O_3$ has the double function of improving the resistance to moisture of the glass and improving the strength of the glass network; that is, $Al_2O_3$ makes the $SiO_2$ network tighter and therefore more stable. The amount of $Al_2O_3$ employed in the glass ranges from about 3 to 10 molar percent. Above 10% the thermal coefficient of expansion decreases rapidly because aluminum is a small trivalent ion. Below 3% of $Al_2O_3$ there is insufficient amount of $Al_2O_3$ present to contribute significantly to tightening of the glass network.

MgO is used to insure moisture resistance for the glass. For that purpose an element such as magnesium having a small ion is preferred. Calcium oxide could be used but the calcium ion is larger than that of magnesium. Beryllium oxide would be better, but beryllium involves a toxicity problem. Barium oxide is less desirable than MgO, because the barium ion is much larger than that of magnesium and therefore would cause an expanded glass network, whereby the bond between the metal and the glass is weaker. Although MgO may be added in the range of from about 3 to 8 molar percent, it is preferably added in proportion to $Al_2O_3$ so that the total amount of $Al_2O_3$ and MgO is not above about 18 molar percent. Above that amount the softening temperature of the glass increases. Accordingly, the preferred amounts of $Al_2O_3$ and MgO are 6% and 5%, respectively. In addition, where the total of $Al_2O_3$ and MgO is above 18 molar percent the thermal expansion coefficient decreases rapidly.

The following example is illustrative of the present invention.

EXAMPLE

Duplicate samples of glass of molar compositions, having 9% $K_2O$, 10% $Na_2O$, 70% $SiO_2$, 6% $Al_2O_3$, and 5% MgO were prepared from common laboratory reagents. The glass samples were fused in a globar furnace with continuous stirring, then cast onto a slab. The slab was subsequently annealed and sections of glass samples were cut for measurements.

Figure 2:
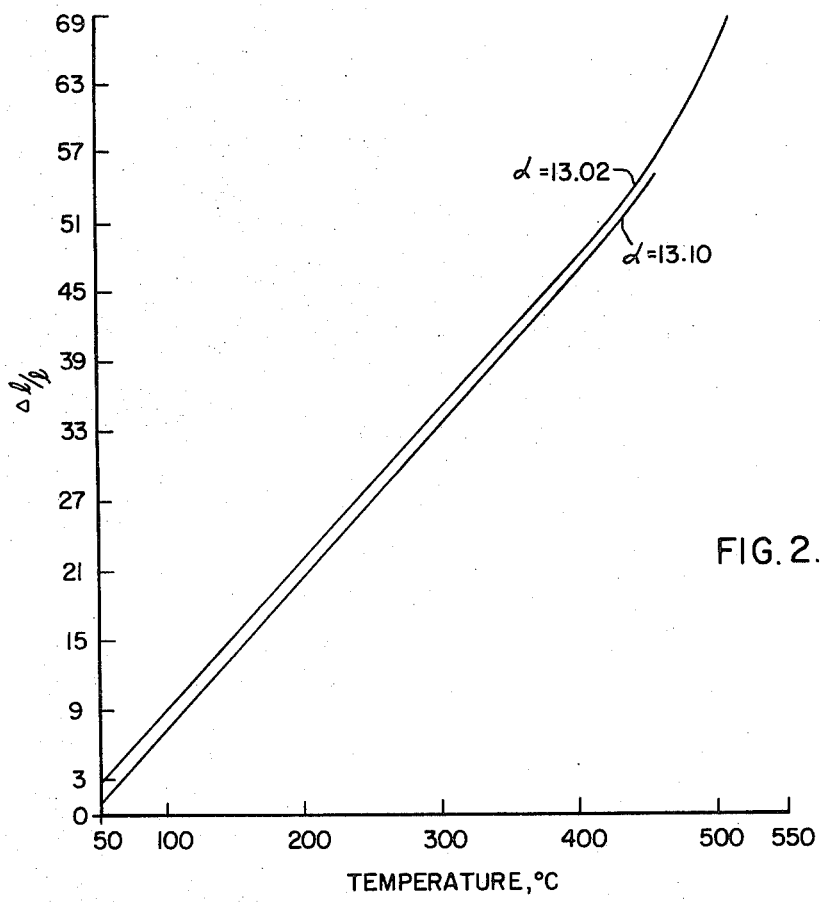
FIG. 2 is a graph showing thermal expansion measurements for duplicate samples of glass versus temperature in degrees centigrade.

The thermal expansion measurements for the duplicate samples is shown in FIG. 2. The sag point (viscosity of approximately $10^{10}$ poises) of the glass is about 530°C for both samples. From the expansion curves in FIG. 2 the annealing point of the glass is estimated to be about 450°C. The thermal coefficient of expansion, calculated from the linear part of the curves, is about $13.1 \times 10^{-6}/°C$ for the samples.

Moreover, the glass samples were not attacked by boiling water during a two hour immersion test period. This is attributed to the fact that the silicate glass is stabilized by the presence of equimolar amounts of $K_2O$ and $Na_2O$. In addition, the presence of $Al_2O_3$ and MgO increased the chemical durability of the glass. Due to the equimolar content of $K_2O$ and $Na_2O$ the electrical properties of the glass were deemed highly satisfactory.

The thermal expansion coefficient of the glass of this invention matches very closely that of cold rolled and stainless steels and of nickel and nichrome alloys. These metals also have expansion coefficients of about $13 \times 10^{-6}/°C$ between room temperature and 500°C. The high expansion coefficient as well as satisfactory electrical and chemical properties are an advantage for this glass were used in a heating element such as shown in FIG. 1.

Various modifications may be made within the spirit of this invention.

What is claimed is:

1. A glass-to-metal seal comprising a metal and a glass, wherein said metal is characterized by a linear coefficient of expansion of about $13 \times 10^{-6}/°C$ and said glass is characterized by a linear thermal expansion coefficient of from about 12 to $14 \times 10^{-6}/°C$ and good resistance to moisture penetration and consisting essentially of, by molar percent, from about 60 to 75% of $SiO_2$, from about 7 to 12.5% each of $K_2O$ and $Na_2O$, from about 3 to 10% of $Al_2O_3$, and from about 3 to 8% of MgO.

2. The glass-to-metal seal of claim 1 wherein said glass consists essentially of about 67 to 72% of $SiO_2$, from about 17 to 22% of $K_2O$ and $Na_2O$, from about 4 to 8% of $Al_2O_3$, and from about 4 to 7% of MgO.

3. The glass-to-metal seal of claim 2 wherein said glass consists essentially of about 70% of $SiO_2$, about 9% of $K_2O$, about 10% of $Na_2O$, about 6% of $Al_2O_3$, and about 5% of MgO.

* * * * *